US006683744B2

(12) United States Patent
Takano et al.

(10) Patent No.: US 6,683,744 B2
(45) Date of Patent: Jan. 27, 2004

(54) MAGNETIC DISK EVALUATION APPARATUS AND METHOD

(75) Inventors: Yukihiro Takano, Kanagawa (JP); Kiminori Sato, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 377 days.

(21) Appl. No.: 09/909,465

(22) Filed: Jul. 19, 2001

(65) Prior Publication Data

US 2002/0018314 A1 Feb. 14, 2002

(30) Foreign Application Priority Data

Jul. 19, 2000 (JP) ........................................ 2000-219730

(51) Int. Cl.[7] ........................ G11B 5/596; G11B 21/02; G11B 27/36
(52) U.S. Cl. ........................ 360/78.11; 360/75; 360/31; 360/77.04; 360/77.03; 324/212
(58) Field of Search .............................. 360/31, 51, 53, 360/75, 77.03, 77.04, 78.11; 324/212; 29/603.03

(56) References Cited

U.S. PATENT DOCUMENTS

| | | | |
|---|---|---|---|
| 5,774,295 A | | 6/1998 | Tsai |
| 6,018,437 A | * | 1/2000 | Weichelt et al. ......... 360/97.01 |
| 6,225,799 B1 | | 5/2001 | Gergel et al. |
| 6,304,407 B1 | * | 10/2001 | Baker et al. ................ 360/75 |

FOREIGN PATENT DOCUMENTS

WO WO-97/32301 A1 9/1997

OTHER PUBLICATIONS

Derwent Abstract Accession No. 98–183027/17, JP 10038519 A (CANON KK) Feb. 13, 1998.
Zhou et al. "A Positioning Method For Hard Disk Servow-riter Using An Auto Focus Laser Encoder" Proceedings of the 1999 IEEE/ASME International Conference on Advanced Intelligent Mechatronics, Sep. 19–23, 1999, Atlanta USA, pp. 922–925.

* cited by examiner

Primary Examiner—Andrew L. Sniezek
(74) Attorney, Agent, or Firm—Darby & Darby

(57) ABSTRACT

A magnetic-disk evaluation apparatus includes a magnetic head positioned relative to a magnetic disk including temporary servo signals. Fluctuation of a magnetic head in a seek direction is measured using a measurement device. A measuring rotating arm moves in tandem with a rotating stage holding a rotary positioner. The measurement device is on the measuring rotating arm. The rotary positioner is controlled on the basis of temporary servo signals to position the magnetic head on a circle, concentric from a center of a spindle motor. Fluctuation of the magnetic head in the seek direction is measured to detect the displacement of the magnetic head and to determine whether the temporary servo signals are acceptable based upon the displacement and an outside standard.

14 Claims, 15 Drawing Sheets

Fig. 4        Prior Art

15(A)
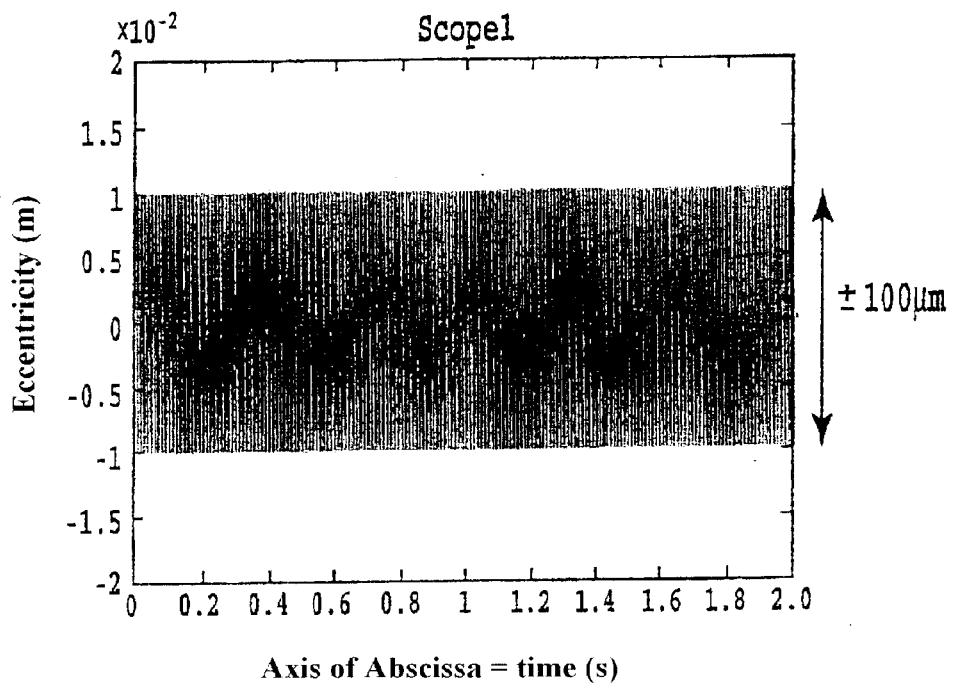
15(B)
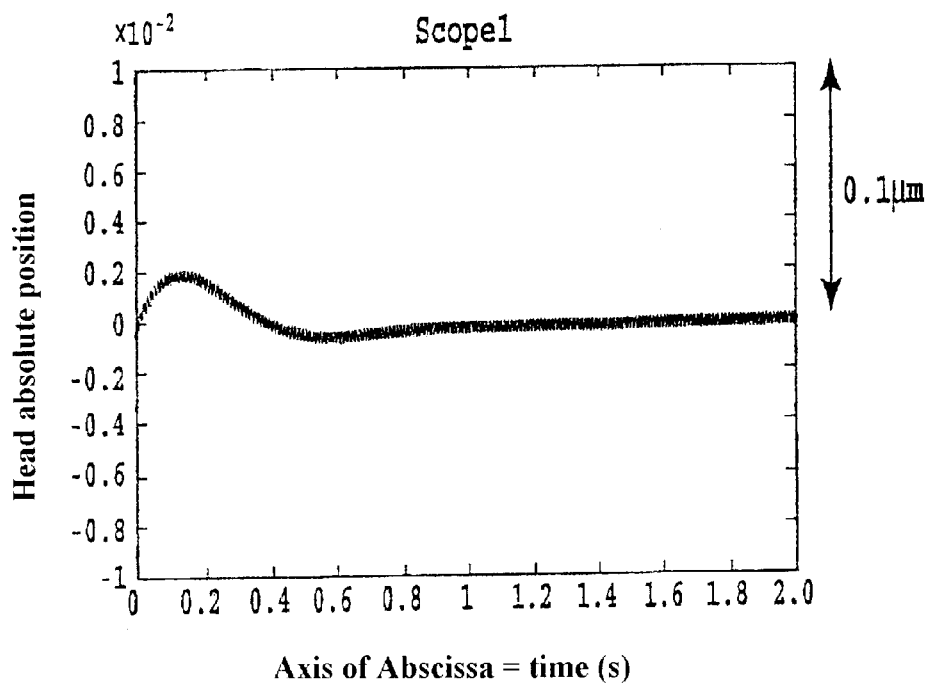

MAGNETIC DISK EVALUATION APPARATUS AND METHOD

BACKGROUND OF THE INVENTION

1. Field of the Invention

The present invention relates to a magnetic-disk evaluation apparatus (i.e., a spin stand) for determining, without writing actual servo signals to a magnetic disk, whether temporary servo signals previously written to a magnetic disk by magnetic transfer are acceptable. The present also further relates to a method for evaluating temporary servo signals previously written to a magnetic disk for use in the self servo writing method for magnetic disk apparatuses.

2. Description of the Related Art

Hard disk drives (HDD) are commonly used as information storage devices, and operate to position their heads on the basis of servo signals written to a magnetic disk.

Referring now to FIG. 1, a conventional HDD 30 [hereinafter HDD 30] includes a magnetic disk 1 rotatable at several thousand rpm by a spindle motor 2. During rotation, air flow above magnetic disk 1 causes a slider 4 located at the tip of a rotary positioner 3 to float slightly above magnetic disk 1.

A magnetic head 5 is located at an end of slider 4. During operation, servo signals are magnetically written on magnetic disk 1 and are detected by magnetic head 5, amplified by a preamplifier 6, and demodulated by a servo demodulating circuit 7, to obtain track information (indicating on which track the magnet head is lying) and a PES (Position Error Signal, which indicates how far the head is separated from the center of a track).

During operation, HDD 30 determines the current head position by using magnetic head 5 to read the servo signals, and positions magnetic head 5 on a track (target track) with desired information written thereto by using a voice coil motor (VCM) 8 to drive rotary positioner 3.

That is, the difference between the target track position and the head position is detected as the PES, which is input to a compensator 9. Then, compensator 9 generates a drive command to rotary positioner 3 on the basis of the PES and transmits this drive command to voice coil motor (VCM) 8 through power amplifier 10. In this manner, voice coil motor (VCM) 8 drives rotary positioner 3. Thus, feeding back the PES serves to reduce the positional difference between the target track and the head position. Further, in terms of absolute coordinates, the target track position varies in accordance with rotational cycles due to the eccentricity of the disk itself.

During operation, magnetic disk 1 has the above servo signals and data recorded thereon and reproduced therefrom by magnetic head 5. A defect in magnetic disk 1 prevents proper recording or reproduction. Thus, magnetic disk 1 must be tested before integration (that is, magnetic disk 1 is clamped to spindle motor 2) to ascertain that magnetic disk 1 can provide minimum required performance.

The test consists of using a magnetic head to sequentially check magnetic disk 1 for its gliding property, its certify property, and its contact start stop (CSS) property. The gliding property check consists of checking the number of projections on magnetic disk 1. The certify property check consists of checking magnetic disk 1 for its electric properties and defects. The contact start stip (CSS) property check consists of checking the durability of magnetic disk 1.

It should be understood, that an apparatus used to evaluate the performance of magnetic disk is called a "spin stand."

Referring additionally now to FIG. 2 shows a "spin stand" having a base 11 which supports a spindle motor 12. During operation, spindle motor 12 rotates at an arbitrary rotation speed allowing magnetic disk 1 to be evaluated. An evaluating magnetic head 13 reproduces and records signals on and from magnetic disk 1 in order to evaluate magnetic disk 1. A carriage 14 supports evaluating magnetic head 13. A 'θ' stage 15 [hereinafter θ stage 15] adjusts carriage 14 to an arbitrary angle. A stage 16 is movable in at least one direction along a guide 17 in order to freely vary the positional relation ship between spindle motor 12 and evaluating magnetic head 13. It is to be understood, that stage 16 is movable in a direction in FIG. 2 along guide 17.

It is to be understood, that HDD 30, based on the head positioning method using rotary positioner 3 driven by voice coil motor (VCM) 8, has the advantage of having a compact structure but also has a drawback in that the head skew angle varies with the track.

The head skew angle relates to the flying head height of magnetic head 13 and causes variations in the reproduction output from magnetic head 13. Accordingly, the same skew angle as that in conventional HDD 30 must also be used in conducting the above-described gliding, certifying, and CSS property checks in order to evaluate the performance of magnetic disk 1.

Thus, for these checks, the positional relationship between spindle motor 12 and evaluating magnetic head 13 of the spindle stand must be adjusted to be identical to that in HDD 30, so that commonly used spin stands must include a positioning mechanism based upon directly moving stage 16, the rotary θ stage 15, or similar parts.

The above-described checks are then carried out using the spin stand and, if magnetic disk 1 is determined to be acceptable, magnetic disk 1 is clamped to spindle motor 2, which is then assembled into HDD 30.

With magnetic disk 1 integrated into HDD 30 (that is, magnetic disk 1 is clamped to spindle motor 2), a device called a "servo track writer (STW) " is used to write servo signals to magnetic disk 1.

Additionally referring now to FIG. 3, during operation, the servo track writer (STW) is used to produce servo tracks. During operation, the servo track writer (STW) conventionally presses a pin 19, accurately positioned by an external actuator 18, against rotary positioner 3 inside HDD 30, via a link 20 for positioning, while setting the head position on the basis of a scale inside actuator 18 using a fine feeding mechanism.

Since the servo signals are each written to a corresponding one of the tracks on magnetic disk 1, the servo track writer (STW) must write the servo signals to all the tracks on magnetic disk 1 while executing accurate positioning via link 20. Since an increase in recording density increases the number of tracks while reducing the track width, the servo track writer (STW) must execute more accurate positioning on a larger number of tracks.

Unfortunately, this realization of accurate positioning requires a rigid and expensive mechanical positioning mechanism as well as a large amount of time for writes. Consequently, multiple servo track writers (STW) must be provided for parallel processing, further requiring a larger space in manufacturing clean rooms in which the servo track writers (STWs) are arranged. This requirement also increases costs.

Considerable effort has been put into developing a method for omitting the above described servo track writers (STWs) and causing HDD 30 to execute self servo writing.

Additionally referring now to FIG. 4, temporary servo signals 21 have already been written to magnetic disk 1. It is to be understood, that temporary servo signals 21 can be written to magnetic disk 1 substantially faster than with the servo track writers (STWs). This faster writing may be accomplished, for example, by using a technique such as magnetic printing to copy a magnetic pattern from a master disk (not shown).

After an initial writing, magnetic disk 1 is integrated into HDD 30, which then writes only actual servo signals 22 to disk 1 on the basis of temporary servo signals 21.

Subsequently, the magnetic head is positioned on the basis of actual servo signals 22, and it is confirmed that HDD 30 operates correctly.

Unfortunately, if HDD 30 cannot operate correctly due to any defect in either actual servo signals 22 or temporary servo signals 21, the positioner section must be disassembled so that magnetic disk 1 can be replaced with a new one, to which temporary servo signals 21 and actual servo signals 22 are then rewritten.

Additionally referring now to FIG. 5, the servo signals are stored on the unitary magnetic disk, so that when magnetic disk 1 is chucked on spindle motor 12 of the spin stand, the central position of tracks 21 formed from recorded servo signals may be offset from the central position of spindle motor 12 by several ten to thousand micrometers.

Consequently, signals reproduced from tracks 21 are observed to be eccentric to the rotational center of magnetic disk. A maximum size A, is defined as a maximum eccentricity of tracks 21. Thus, following up servo signals requires the formation of a control system that compensates for this eccentricity.

Unfortunately, although the object of the conventional method is to reduce the amount of time required by the servo track writers (STWs), and to reduce costs, the quality of the servo signals cannot be evaluated before writing actual servo signals 22 to magnetic disk 1. Consequently, this method requires the same operation to be performed twice and is thus inefficient in terms of costs and time.

Thus, if servo signals have already been recorded on the unitary magnetic disk, evaluation of the unitary magnetic disk is conducted, and before magnetic head 5 is integrated into HDD 30, it must be furthermore determined on the basis of temporary servo signals 21, previously recorded on magnetic disk 1, that actual servo signals 22 can be used in order to evaluate the unitary magnetic disk and to position magnetic head 5.

OBJECTS AND SUMMARY OF THE INVENTION

It is an object of the present invention to overcome the detrimental concerns described above.

It is another object of the present invention to provide a magnetic-disk evaluating apparatus and a method that can determine whether temporary servo signals are acceptable without writing the actual servo signals to the magnetic disk.

It is another object of the present invention to provide an apparatus where even if the magnetic head is moved to various positions, the measuring instrument moves correspondingly and thus need not be adjusted, facilitating measurement of the positional displacement of the magnetic head.

Briefly stated, the present invention provides a magnetic-disk evaluation apparatus including a magnetic head positioned on the basis of temporary servo signals. Fluctuation of the magnetic head in a seek direction is measured using a measurement device. A measuring rotating arm moves in tandem with a rotating stage holding a rotary positioner. The measurement device is installed on the measuring rotating arm. The rotary positioner is controlled on the basis of the temporary servo signals to position the magnetic head on a circle, concentric from a center of a spindle motor operating a magnetic disk. Fluctuation of the magnetic head in the seek direction is measured to detect the displacement of a tip of the magnetic head and to determine whether the temporary servo signals are acceptable based upon the displacement.

According to an embodiment of the present invention there is provided a magnetic-disk evaluation apparatus, for evaluating a magnetic disk having a plurality of temporary servo signals, comprising: a spindle motor, the spindle motor operating the magnetic disk at a rotation speed effective to enable an evaluation of the magnetic disk, a rotary positioner supporting a magnetic head about a rotation shaft, the magnetic head operable relative to the spindle motor and the magnetic disk, control means for controlling the rotary positioner and the magnetic head on a basis of the plurality of temporary servo signals and positioning the magnetic head relative to a concentric circle centered on the spindle motor prior to the evaluation of the plurality of temporary servo signals, measurement means for accurately measuring a head displacement of the magnetic head in a seek direction relative the magnetic disk, detection means for detecting a tip displacement of a tip of the magnetic head on a basis of the head displacement in the seek direction, and determination means for determining whether the temporary servo signals are acceptable, on a basis of the tip displacement, effective to allow the magnetic-disk evaluation apparatus to effective and rapidly evaluate the magnetic disk.

According to an embodiment of the present invention there is provided a magnetic-disk evaluation apparatus, for evaluating a magnetic disk having a plurality of temporary servo signals, further comprising: fixation means for temporary fixing the rotary positioner effective to locate the magnetic head at an arbitrary position on the magnetic disk, a positioner rotating stage for supporting the fixation means and the rotary positioner and moving the rotary positioner, fixed by the fixation means, to an arbitrary position on the magnetic disk, the positioner rotating stage rotating around a rotating center, a measuring rotating arm rotating around the same the rotating center as the positioner rotating stage based on a movement angle of the positioner rotating stage, and the measurement means on the measuring rotating arm, whereby the measurement means is positioned to effectively measure the displacement of the magnetic head in the seek direction.

According to an embodiment of the present invention there is provided a magnetic-disk evaluation apparatus, for evaluating a magnetic disk having a plurality of temporary servo signals, wherein the control means further comprises: storage means for storing an eccentricity of the magnetic disc measured on a basis of a first signal from the magnetic head reading the temporary servo signals while the rotary positioner is fixed by the fixation means, cancel means for canceling the eccentricity of the magnetic disk in the first signal from the magnetic head by receiving a feed forward input of the eccentricity stored in the storage means and by generating a second signal, and feedback compensating means for generating, from at least the second signal sent from the cancel means, a third signal for feedback-controlling of the rotary positioner, enabling effective cancellation of eccentricity in a speedy manner.

According to an embodiment of the present invention there is provided a magnetic-disk evaluation apparatus, for evaluating a magnetic disk having a plurality of temporary servo signals, wherein: the measurement means is a laser Doppler vibrometer effective to measure the displacement of the magnetic head in the seek direction by irradiating a side of the magnetic head with a plurality of laser beams and receiving a reflection therefrom.

According to another embodiment of the present invention there is provided a magnetic-disk evaluation apparatus, for evaluating a magnetic disk having a plurality of temporary servo signals, comprising: a spindle motor, the spindle motor operating the magnetic disk at a rotation speed effective to enabling an evaluation of the magnetic disk, a rotary positioner supporting a magnetic head about a rotation shaft, the magnetic head operable relative to the spindle motor and the magnetic disk, control means for controlling the rotary positioner and the magnetic head on a basis of the plurality of temporary servo signals and positioning the magnetic head relative to a concentric circle centered on a center of the spindle motor prior to the evaluation of the plurality of temporary servo signals, measurement means for accurately measuring a head displacement of the magnetic head in a seek direction, detection means for detecting a tip displacement of a tip of the magnetic head on a basis of the head displacement in the seek direction, determination means for determining whether the temporary servo signals are acceptable, on a basis of the tip displacement, effective to allow the magnetic-disk evaluation apparatus to effective and rapidly evaluate the magnetic disk, fixation means for temporary fixing the rotary positioner effective to locate the magnetic head at an arbitrary position on the magnetic disk, a positioner rotating stage for supporting the fixation means and the rotary positioner and moving the rotary positioner, fixed by the fixation means, to an arbitrary position on the magnetic disk, the positioner rotating stage rotating around a rotating center, a measuring rotating arm rotating around the same the rotating center as the positioner rotating stage based on a movement angle of the positioner rotating stage, and the measurement means on the measuring rotating arm, whereby the measurement means is positioned to effectively measure the displacement of the magnetic head in the seek direction.

According to an embodiment of the present invention there is provided a magnetic-disk evaluation apparatus, comprising: a magnetic disk including a plurality of temporary servo signals, a spindle motor on the magnetic-disk evaluation apparatus, the spindle motor effective to enable an evaluation of the magnetic disk, a magnetic head operable relative to the spindle motor and the magnetic disk, a rotary positioner supporting the magnetic head about a rotation shaft, the rotation shaft supporting at least the magnetic head and the rotary positioner, voice coil means at a first end of the rotary positioner opposite the magnetic head effective to drive the rotary positioner on a basis of a command, control means for issuing the command and controlling the rotary positioner on a basis of the plurality of temporary servo signals and positioning the magnetic head relative to a concentric circle centered on a center of the spindle motor prior to the evaluation of the plurality of temporary servo signals, measurement means for accurately measuring a first displacement of the magnetic head in a seek direction, detection means for detecting a second displacement of a tip of the magnetic head on a basis of the first displacement in the seek direction, and determination means for determining whether the temporary servo signals are acceptable, on a basis of the second displacement, effective to allow the magnetic disk evaluation apparatus to effective and rapidly evaluate the magnetic disk.

According to another embodiment of the present embodiment there is provided a magnetic-disk evaluation apparatus for evaluating a magnetic disk, comprising: a base effective to support the magnetic-disk evaluation apparatus, a spindle motor on the base, the spindle motor rotatable at an arbitrary rotation speed effective to enable the evaluation of the magnetic disk, a magnetic head operable relative to the spindle motor, the magnetic head effective for recording electronic signals on and for reproducing electronic signals from the magnetic disk to enable the evaluation, a suspension supporting the magnetic head, a rotary positioner supporting the suspension about a rotation shaft, a voice coil at a first end of the rotary positioner opposite the magnetic head, the rotation shaft cantilevered from the base and supporting the magnetic head, the suspension, and the rotary positioner, a first and a second magnet opposite a respective first and second side of the voice coil, the magnetic disk including a plurality of temporary servo signals, control means for control driving of the rotary positioner on a basis of the plurality of temporary servo signals and being effective to position the magnetic head on a circle concentric to a center of the spindle motor, prior to an initial evaluation of the plurality of temporary servo signals, measurement means for measuring a head displacement of the magnetic head in a seek direction, detection means for detecting a tip displacement of a tip of the magnetic head on a basis of the head displacement in the seek direction, and determination means for determining whether the temporary servo signals are acceptable, on a basis of the tip displacement, whereby the magnetic-disk evaluation apparatus can rapidly and effectively evaluate the magnetic disk.

According to another embodiment of the present invention there is provided a magnetic-disk evaluation apparatus, further comprising: fixation means for temporarily fixing the rotary positioner effective to locate the magnetic head at an arbitrary position on the magnetic disk, a positioner rotating stage for supporting the fixation means and the rotary positioner and moving the rotary positioner, fixed by the fixation means, to an arbitrary position on the magnetic disk, the positioner rotating stage rotating around a rotating center, and a measuring rotating arm rotating around the same the rotating center as the positioner rotating stage based on a movement angle of the positioner rotating stage, and the measurement means on the measuring rotating arm, whereby the measurement means is positioned to effectively measure the displacement of the magnetic head in the seek direction.

According to another embodiment of the present invention there is provided a magnetic-disk evaluation apparatus, wherein: the measurement means is a laser Doppler vibrometer effective to measure the displacement of the magnetic head in the seek direction by irradiating a side of the magnetic head with a plurality of laser beams to receive a reflection therefrom.

According to another embodiment of the present invention there is provided a magnetic-disk evaluation apparatus, wherein the control means further comprises: storage means for storing an eccentricity of the magnetic disc measured on a basis of a first signal from the magnetic head reading the temporary servo signals while the rotary positioner is fixed by the fixation means, cancel means for canceling the eccentricity of the magnetic disk in the first signal from the magnetic head by receiving a feed forward input of the eccentricity stored in the storage means and by generating a second signal, and feedback compensating means for generating a third signal for feedback-controlling of the rotary positioner, from the second signal sent from the cancel means whereby the eccentricity is effectively canceled in a speedy manner.

According to another embodiment of the present invention there is provided a magnetic-disk evaluation method for evaluating a magnetic disk, employing a magnetic-disk evaluation apparatus having a base as a support for the apparatus, a spindle motor on the base for rotating the magnetic disk at an arbitrary rotation speed, a magnetic head for recording and reproducing signals on and from the magnetic disk effective to evaluate the magnetic disk, a suspension supporting the magnetic head, a rotary positioner supporting the suspension, a voice means at first end of the rotary positioner opposite to the magnetic head, a rotating shaft cantilevered from the base, the rotating shaft supporting the magnetic head, the suspension, and the rotary positioner, comprising: a control step of operative control driving of the rotary positioner on a basis of a plurality of temporary servo signals and position the magnetic head on a concentric circle in a center of the spindle motor, before evaluating performance of the temporary servo signals previously written to the magnetic disk, a measurement step of measuring a displacement of the magnetic head in a seek direction, a detection step of detecting displacement of a tip of the magnetic head on a basis of the displacement in the seek direction measured by a measurement means for measuring the displacement, and a determination step of determining whether the temporary servo signals are acceptable, on the basis of the displacement detected by the detection means, whereby a disk evaluation is made speedier and more effective.

According to another embodiment of the present invention there is provided a magnetic-disk evaluation method, wherein the measurement step further includes a step of detecting the displacement of the magnetic head by irradiating a side of the magnetic head with a plurality of laser beams to receive reflected light therefrom, whereby accuracy of the measurement step is increased.

According to another embodiment of the present embodiment there is provided a magnetic-disk evaluation method, wherein the control step further comprises: a storage step of storing the eccentricity of the magnetic disc measured on the basis of the signal from the magnetic head reading the temporary servo signals while the rotary positioner is fixed, a cancel step of canceling the eccentricity of the magnetic disk in the signal from the magnetic head by receiving a feed forward input of the eccentricity stored in the storage means, and a feedback compensating step of generating a signal for feedback-controlling of the rotary positioner, from the signal having the eccentricity canceled at the cancel step.

The present invention further provides a magnetic-disk evaluation apparatus comprising a base as a support table for the apparatus, a spindle motor provided on the base to rotate, at an arbitrary rotation speed, a magnetic disk to be evaluated, a magnetic head for recording and reproducing signals on and from the magnetic disk to evaluate the magnetic disk, a thin suspension for supporting the magnetic head, a thick rotary positioner for supporting the suspension, a voice coil provided at an end of the rotary positioner located opposite to the magnetic head, a rotating shaft installed to protrude from the base and support the magnetic head, the suspension and a pair of magnets sandwiching the voice coil.

The apparatus further includes a control means operative before evaluating performance of temporary servo signals previously written to the magnetic disk, to control driving of the rotary positioner on the basis of the temporary servo signals so that the magnetic head is positioned on a circle concentric to a center of the spindle motor. The apparatus also includes a measurement means for measuring displacement of the magnetic head in a seek direction, detection means for detecting displacement of the tip of the magnetic head on the basis of the displacement in the seek direction which has been measured by the measurement means, and determination means for determining whether the temporary servo signals are acceptable, on the basis of the displacement detected by the detection means.

According to an embodiment of the present invention, there is provided a magnetic-disk evaluation apparatus comprising fixation means for temporarily fixing the rotary positioner so that the magnetic head is located at an arbitrary position on the magnetic disk, positioner rotating stage for supporting the fixation means and the rotary positioner and moving the rotary positioner, fixed by the fixation means, to an arbitrary position on the magnetic disk, and a measuring rotating arm rotating around the same rotating center as that of the positioner rotating stage and depending on a movement angle of the positioner rotating stage, and in that the measurement means is installed on the measuring rotating arm.

According to another embodiment of the present invention, there is provided a magnetic-disk evaluation apparatus further characterized by the measurement means being a laser Doppler vibrometer for measuring the displacement of the magnetic head in the seek direction by irradiating a side of the magnetic head with laser beams to receive a light reflected.

According to another embodiment of the present invention, there is provided a magnetic-disk evaluating apparatus further characterized in that the control means consists of storage means for storing eccentricity of the magnetic disc measured on the basis of a signal from the magnetic head reading the temporary servo signals while the rotary positioner is fixed by the fixation means, cancel means for canceling the eccentricity of the magnetic disk in the signal from the magnetic head by receiving a feed-forward input of the eccentricity stored in the storage means, and feedback compensating means for generating a signal for feedback-controlling of the rotary positioner, from the signal sent from the cancel means and having the eccentricity canceled.

According to another embodiment of the present embodiment there is provided a magnetic evaluation method in a magnetic-disk evaluating apparatus having the same configuration as that of an actual hard disk drive and comprising a base as a support table for the apparatus, a spindle motor provided on the base to rotate, at an arbitrary rotation speed, the magnetic disk to be evaluated, a magnetic head for recording and reproducing signals on and from the magnetic disk to evaluate the magnetic disk, a thin suspension for supporting the magnetic head, a thick rotary positioner for supporting the suspension, a voice coil provided at an end of the rotary positioner located opposite to the magnetic head, a rotating shaft installed so as to protrude from the base, for supporting the magnetic head, the suspension and the rotary positioner, and a pair of magnets sandwiching the voice coil, the method being characterized by consisting of a control step being operative before evaluating performance of temporary servo signals previously written to the magnetic disk, in order to control driving of the rotary positioner on the basis of the temporary servo signals so that the magnetic head is positioned on a concentric circle in the center of the spindle motor, a measurement step of measuring displacement of the magnetic head in a seek direction, a detection step of detecting displacement of the tip of the magnetic head on the basis of the displacement in the seek direction measured by the measurement step, and a determination step of determining whether the temporary servo signals are acceptable, on the basis of the displacement detected by the detection step.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 15(A) is a chart representing the results of the servo simulation of FIG. 14.

FIG. 15(B) is a chart representative of results of the servo simulation in FIG. 14.

DESCRIPTION OF THE PREFERRED EMBODIMENTS

Figure 1:
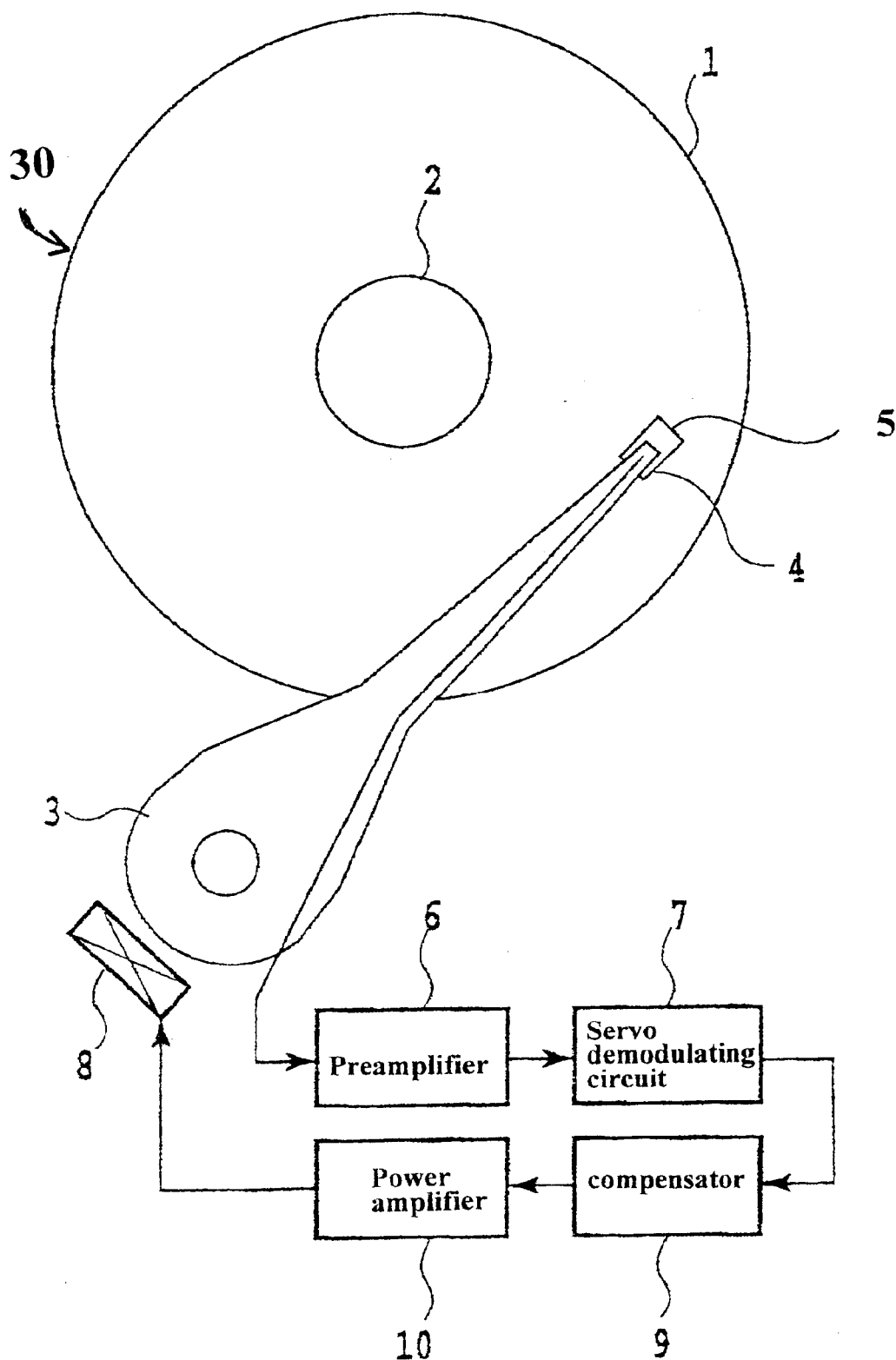
FIG. 1 is a schematic diagram showing a configuration of a conventional HDD.
Figure 2:
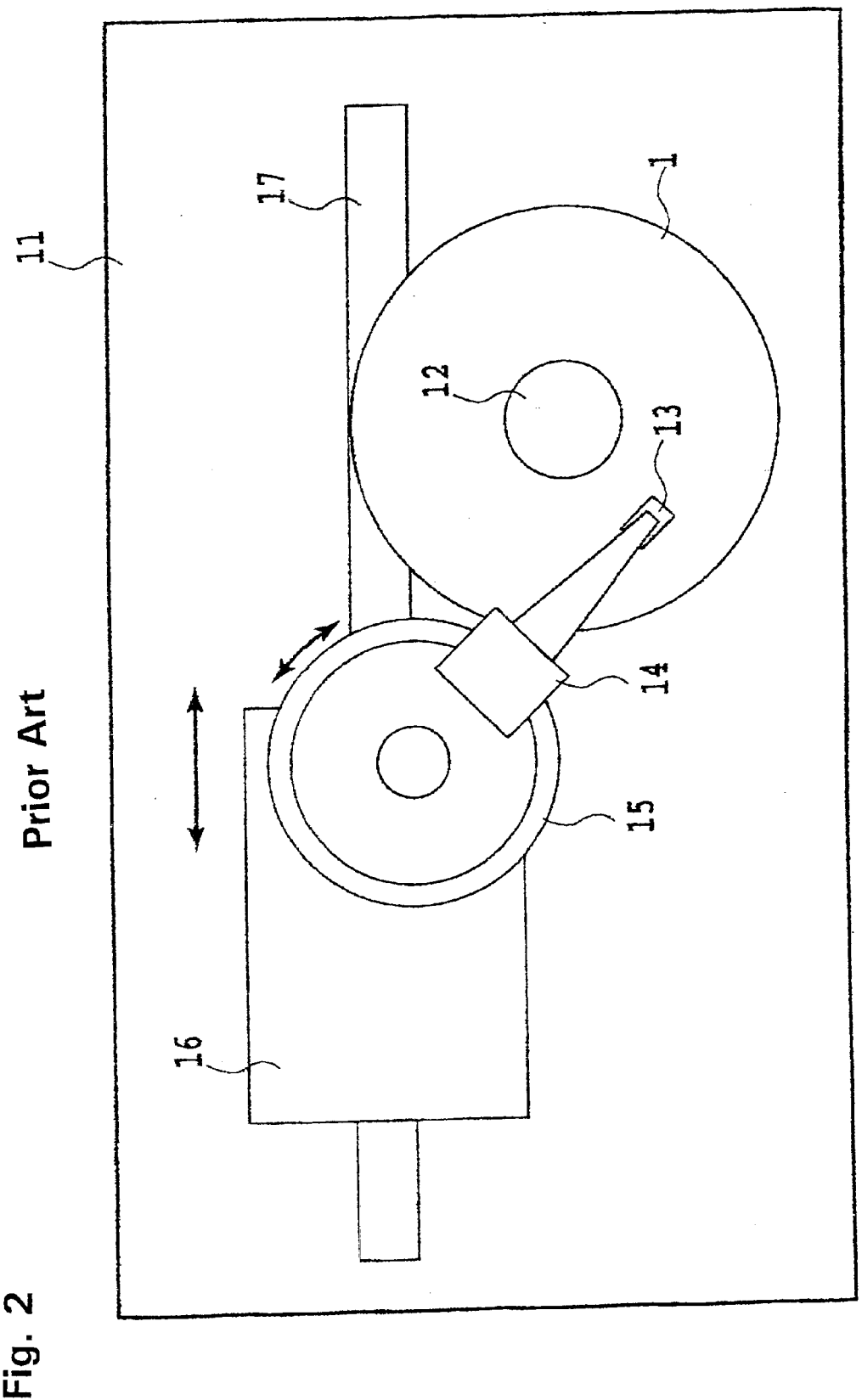
FIG. 2 is a schematic view of a type of conventional spin stand.
Figure 3:
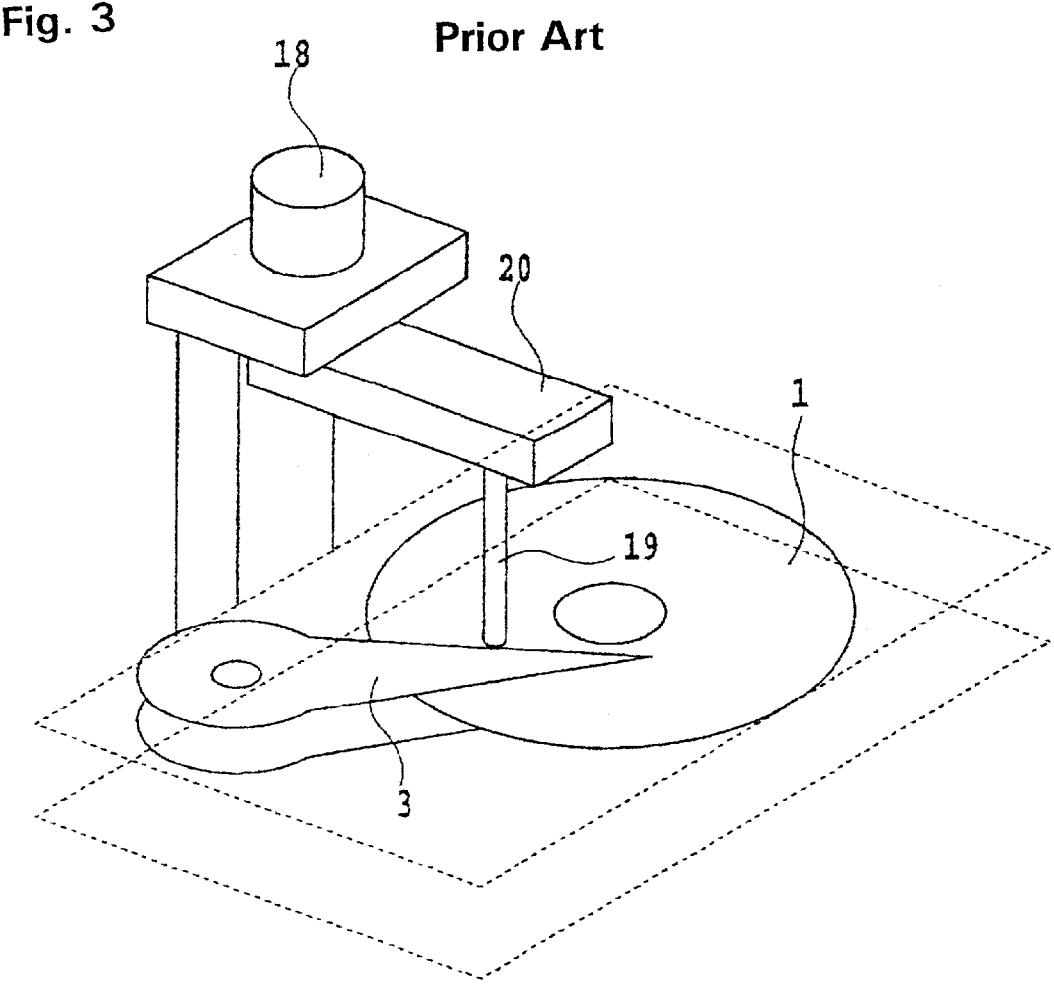
FIG. 3 is a view showing a conventional configuration in which a servo track writer (STW) is used to produce servo tracks.
Figure 4:
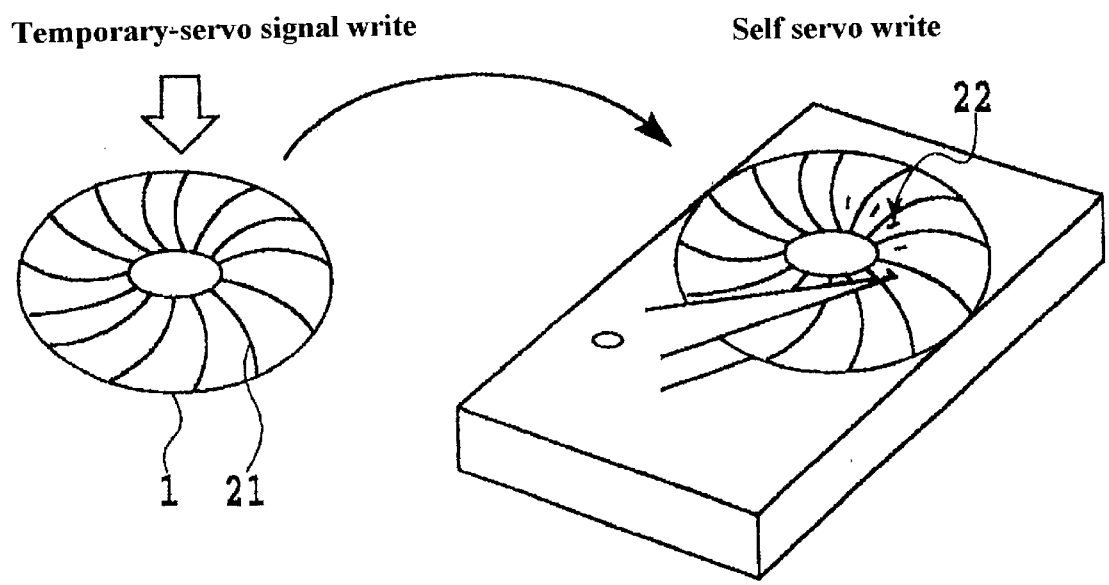
FIG. 4 is an explanatory representation of self servo writing.
Figure 5:
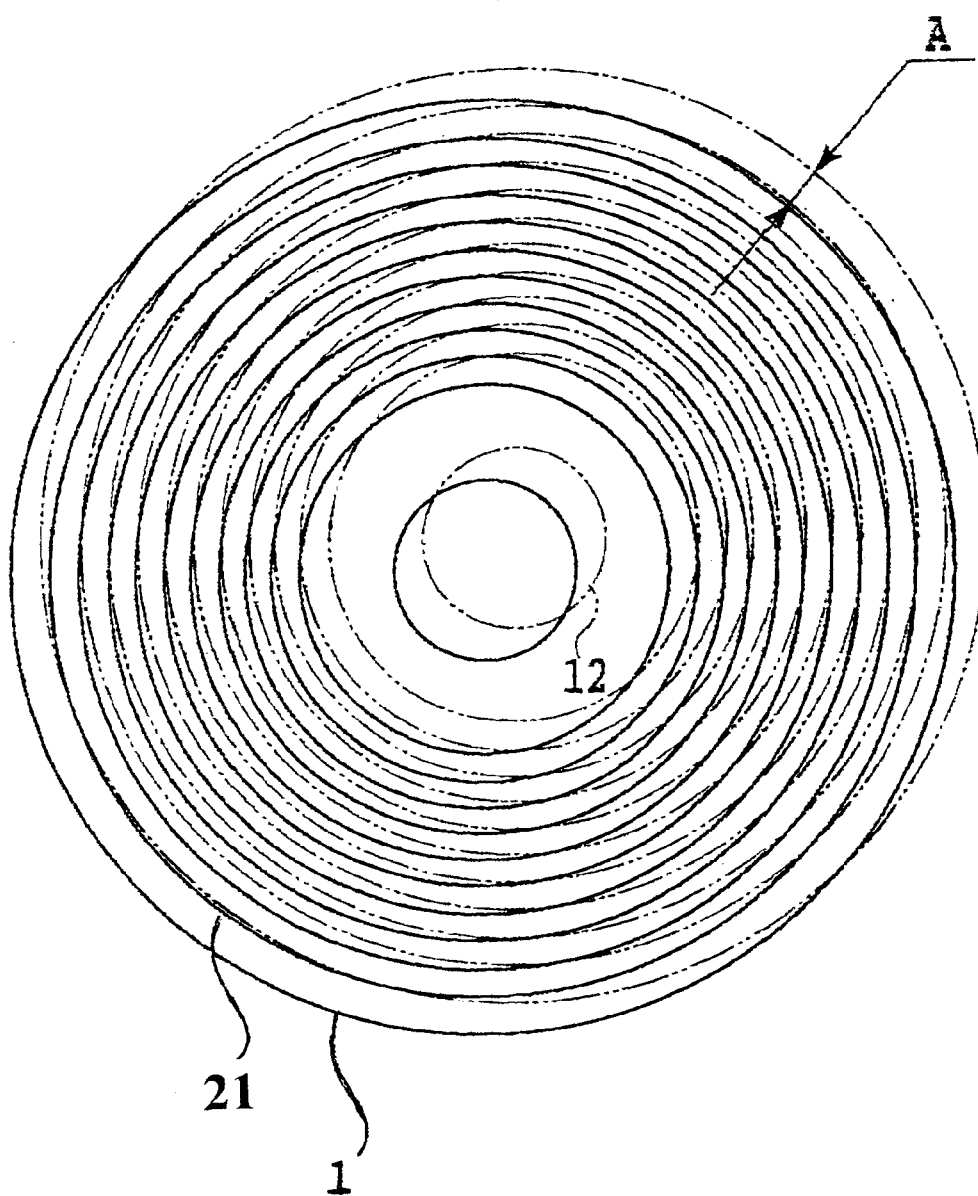
FIG. 5 is an explanatory representation showing how the central position of tracks formed of recorded servo signals is offset from the central position of a spindle motor when a magnetic disk is chucked on the spindle motor.
Figure 6:
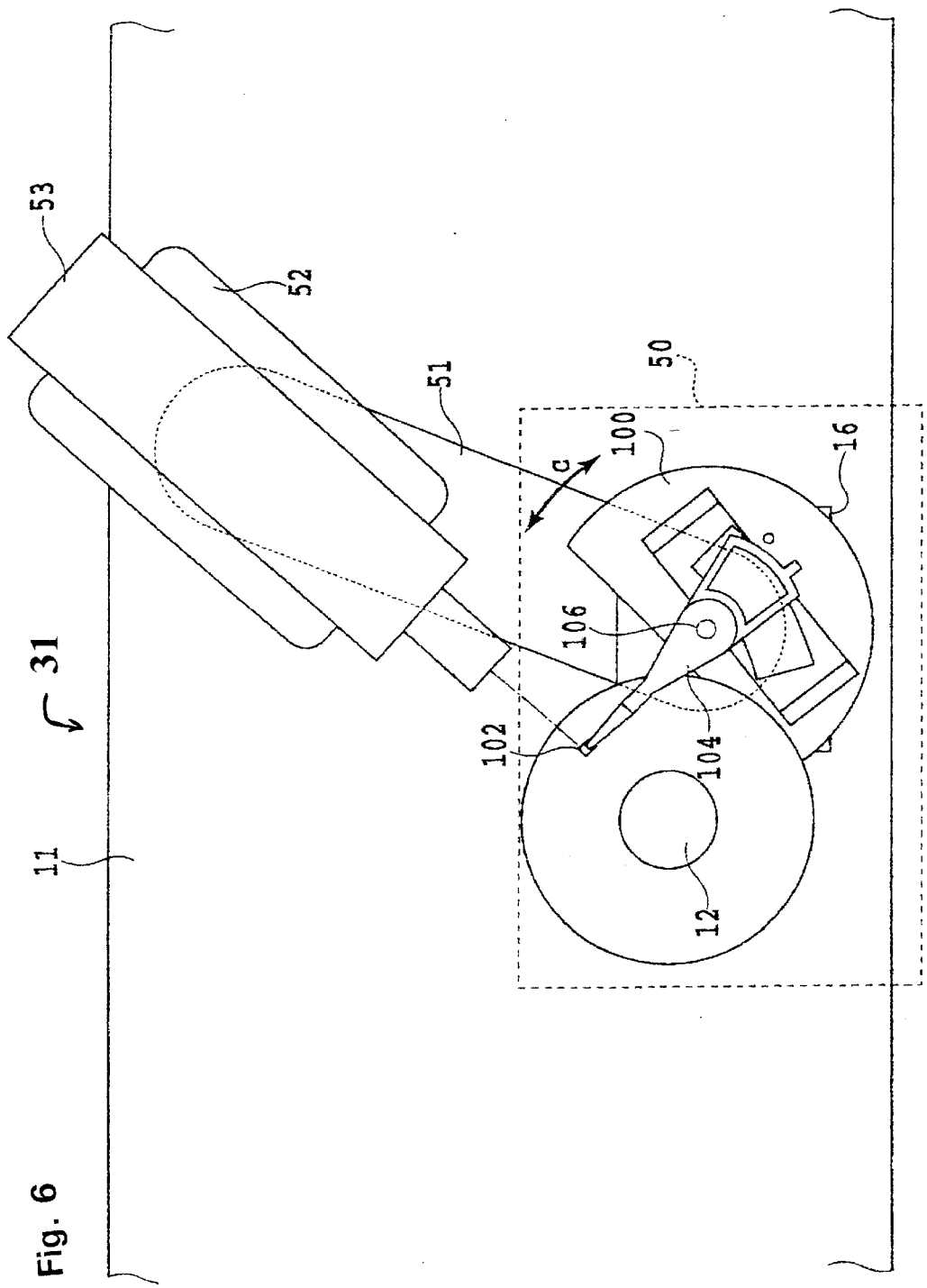
FIG. 6 is a top view showing a magnetic-disk evaluating apparatus according to one embodiment of the present invention.
Figure 7:
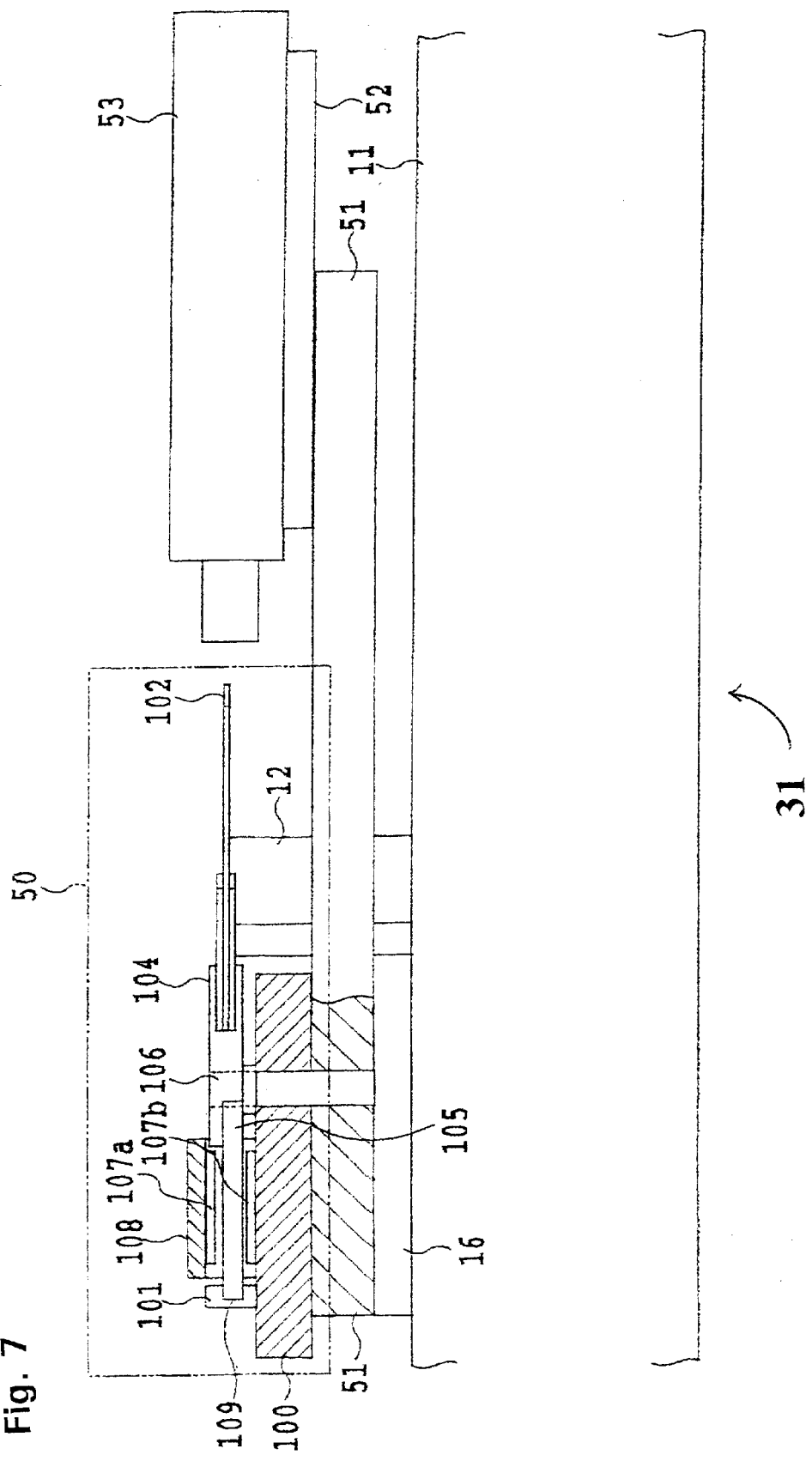
FIG. 7 is a front view of the magnetic-disk evaluating apparatus in FIG. 6.
Figure 8:
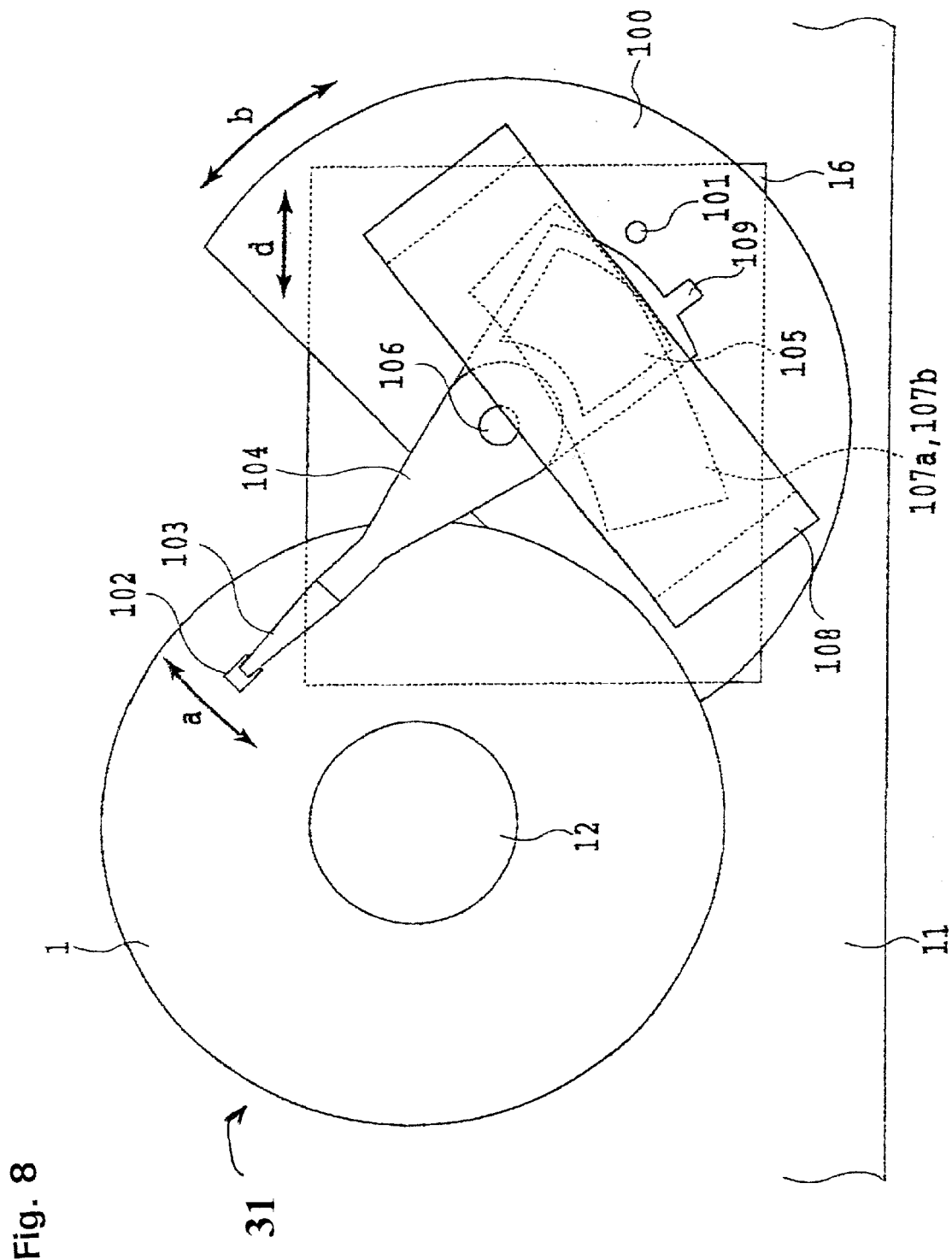
FIG. 8 is an enlarged top view showing an evaluation section of an embodiment of the present invention.

Additionally referring now to FIGS. 6, 7, and 8, a magnetic-disk evaluating apparatus 31 includes an evaluation section 50 and a measuring rotating arm 51, located under evaluation section 50. Evaluation section 50 has the same configuration as that of an actual hard disk drive. A measurement plate 52 is fixed on measuring rotating arm 51, and a measuring means 53 is mounted on measurement plate 52. It is to be understood, that measurement means 53 may be a laser Doppler vibrometer. Base 11 supports evaluation section 50.

Magnetic-disk evaluating apparatus 31 includes spindle motor 12 for rotating a magnetic disk 1 and directly moving stage 16 for adjusting a positional relationship between a spindle motor (not shown) and an evaluating magnetic head 102. Stage 16 includes a positioner rotating stage 100 composed of a half-moon-shaped plate and from which a lock pin 101 protrudes.

Positioner rotating stage 100 includes evaluating magnetic head 102 for recording and reproducing signals on and from magnetic disk 1 in order to evaluate magnetic disk 1. Positioner rotating stage 100 includes a thin suspension 103 for supporting evaluating magnetic head 102 and a thick rotary positioner 104 for supporting suspension 103. Positioner rotating stage 100 further includes a voice coil 105 at an end of rotary positioner 104, opposite magnetic head 102. Positioner rotating stage 100 further includes a rotating shaft 106 directly installed so as to protrude from positioner rotating stage 100. Shaft 106, operably supports magnetic head 102, suspension 103, rotary positioner 104, and voice coil 105.

Voice coil 105 is positioned between a magnet 107b, directly installed on positioner rotating stage 100, and a magnet 107a, installed on positioner rotating stage 100 via a magnet mounting jig 108, thereby constituting a voice coil motor (VCM). The voice coil motor (VCM) drives rotary positioner 104 around rotating shaft 106 the direction of an arrow 'a' shown in FIG. 8.

It should be understood, that positioner rotating stage 100 may be rotated around rotating shaft 106 in the same manner as rotary positioner 104 along the direction of an arrow 'b' shown in FIG. 8. As a result, lock pin 101, installed on stage 100 may be rotated to an arbitrary position around rotating shaft 106.

Rotary positioner 104 has a stopper 109 at an end adjacent voice coil 105. During operation, lock pin 101 and stopper 106 abut each other depending on a position of lock pin 101 thereby regulating the position of rotary positioner 104.

Measuring rotating arm 51 may be rotated around rotating shaft 106 in a direction of an arrow 'c' in FIG. 6 to allow measurement plate 52 and measurement means 53, mounted on arm 51, to be rotated to an arbitrary position around rotating shaft 106.

Further, a measurement point of measurement means 53 is aligned with a side of magnetic head 102 (that is, so that the side of magnetic head 102 is irradiated with laser beams from measurement means 53 i.e. laser Doppler vibrometer, from a vertical direction). The irradiation enables measurement of the fluctuation (settlability) of magnetic head 102 in a seek direction.

It is to be understood, that in FIGS. 9–11(B), upper magnet 107a is not illustrated for the sake of simplification and voice coil 105 is exposed.

Figure 9:
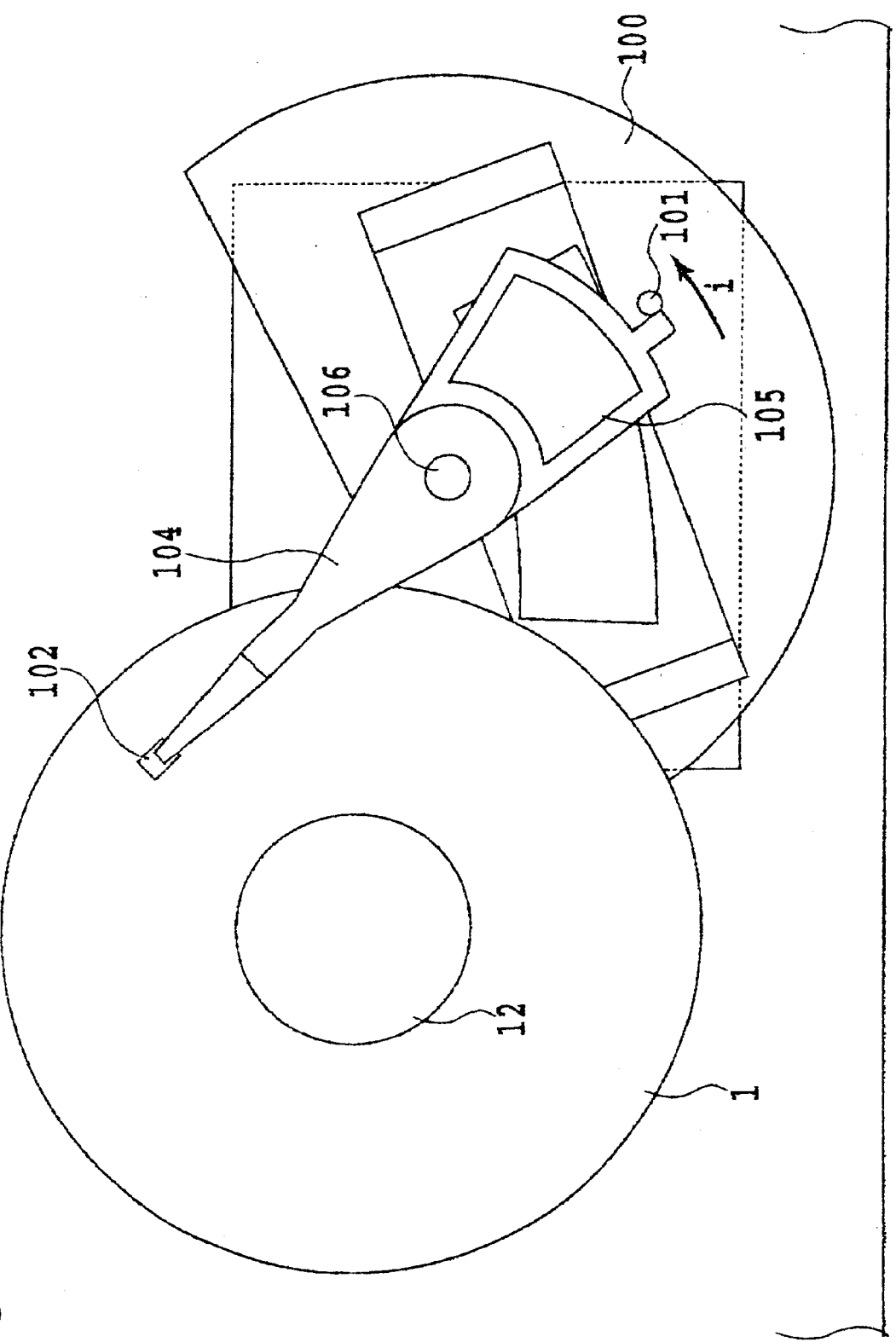
FIG. 9 is a top view showing the state of the magnetic-disk evaluating apparatus in FIG. 8 observed before the start of evaluation.

Referring additionally now to FIG. 9, an evaluation method executed by magnetic-disk evaluating apparatus 31 is explained. It is to be understood, that in FIG. 9, magnetic disk 1 (to be evaluated) is clamped to spindle motor 12 and magnetic disk 1 has temporary servo signals previously written thereto.

During operation, spindle motor 12 acts to rotate magnetic disk 1, and magnetic head 102 of rotary positioner 104 is loaded on the magnetic disk 1 (no diagram of loading process is shown). Since the apparatus has already been powered on to conduct a current (not shown) through voice coil 105 in one direction, rotary positioner 104 rotates in a direction of an arrow 'i' in FIG. 9 and to abut stopper 109 against lock pin 101 to thereby locate rotary position 104 at an initial position.

In this initial position state, positioner rotating stage 100 is driven to an arbitrary position around rotating shaft 106 to rotate stopper 109 of rotary positioner 104 together with lock pin 101, thereby enabling magnetic head 102 to move to an arbitrary position with a mechanism positioning accuracy (the positioning accuracy of positioner rotating stage 100) without the need to control magnetic head 102.

It is to be understood, that in this state, the configuration of the magnetic disk apparatus servo system (shown later in FIGS. 13 to 15), is used to cause magnetic head 102 to read the temporary servo signals previously written on magnetic disk 1 and to measure an eccentricity caused by a chucking of magnetic disk 1, and to store the eccentricity in a memory (not shown)

Figure 10:
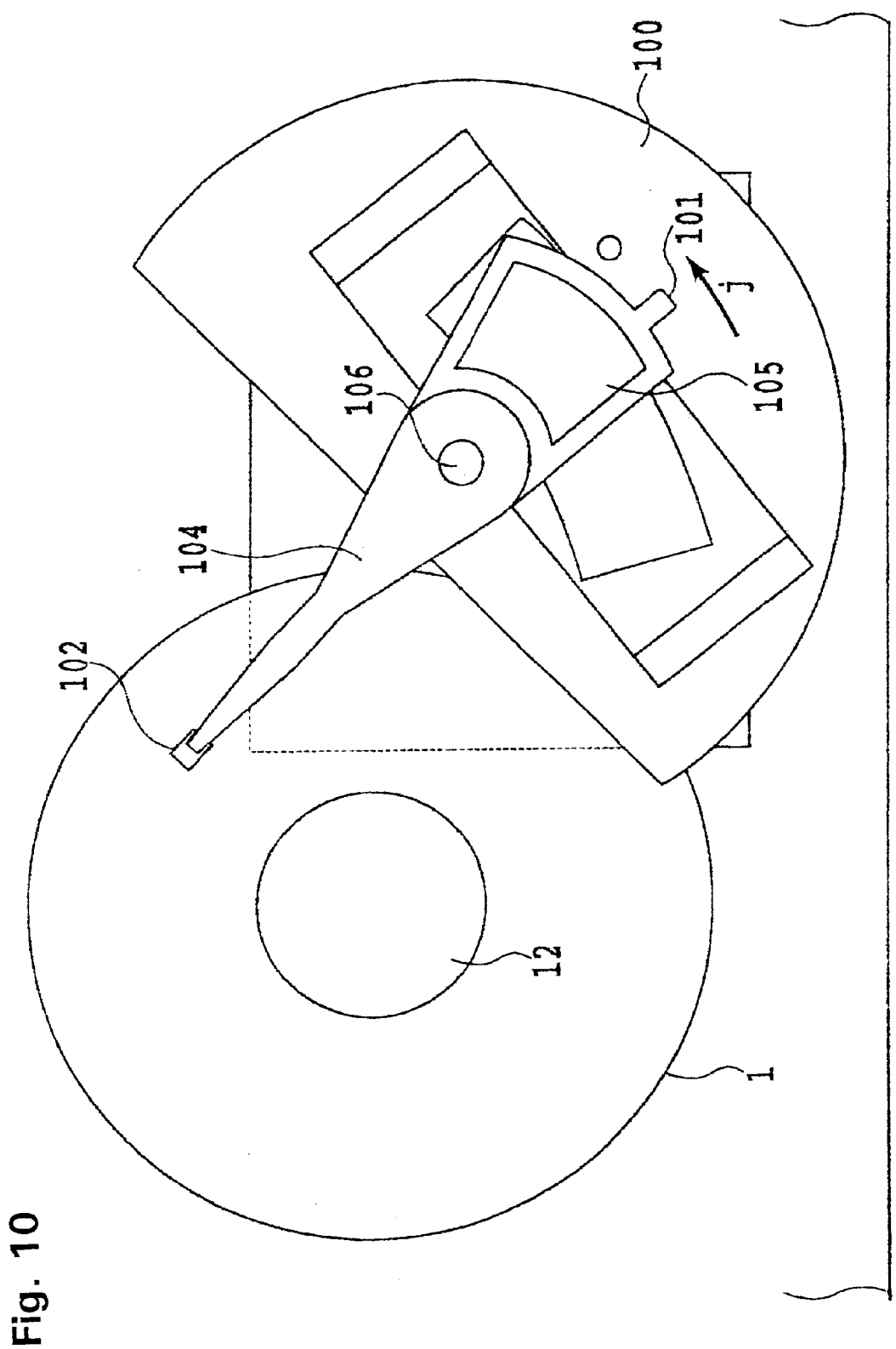
FIG. 10 is a top view showing the magnetic-disk evaluating apparatus in FIG. 8 executing a servo evaluation.

Additionally referring now to FIG. 10, positioner rotating stage 100 in the initial state (shown in FIG. 9) rotates in the direction of an arrow 'j' in FIG. 10 around rotating shaft 106 to free rotary positioner 104, thereby initiating a servo state.

In the servo state, positioner rotating stage 100 is rotated and at the same time, the current flowing through voice coil 105 of rotary positioner 104 in the one direction is cut off. Then, the position of magnetic head 102 on the magnetic disk 1 is detected on the basis of the temporary servo signals reproduced from magnetic head 102, so that positioning control is executed on the basis of the position detecting signal.

Since the position detecting signal contains the eccentricity of magnetic disk 1, the eccentricity based on eccentricity data obtained and stored in the memory (not shown) in the initial state (in FIG. 9) is fed forward to cancel the eccentricity of magnetic disk 1 in the position detecting signal (not shown). Only the resulting head position signal is fed back for positioning control. This operation enables magnetic head 102 to be held on a concentric circle in the center of spindle motor 12.

At this time, the displacement of magnetic head 102 in the seek direction is measured using measurement means 31 (or the above-described laser Doppler vibrometer), in order to evaluate the settlability (displacement or fluctuation) of the tip of the measured magnetic head (not shown). Thus, the quality of the temporary servo signals (not shown) can be numerically checked on the basis of the settlability (displacement or fluctuation) to determine whether the temporary servo signals previously written to magnetic disk 1 are acceptable. It is to be understood, that whether the magnetic head can be positioned can be determined using actual servo signals, with the result of a determination of the acceptability of the temporary servo signals, before magnetic disk 1 is integrated into a HDD (not shown).

Furthermore, with the above-described laser Doppler vibrometer, a vibrating surface of a measuring target is irradiated with laser beams, for example He-Ne laser beams, so that the reflected light obtained is utilized for measurements, thus requiring sufficient focusing. In the above evaluation method, however, the measured surface is a side of magnetic head 102, so that the measured area is too small to facilitate the focusing of irradiation light.

Figure 11B:
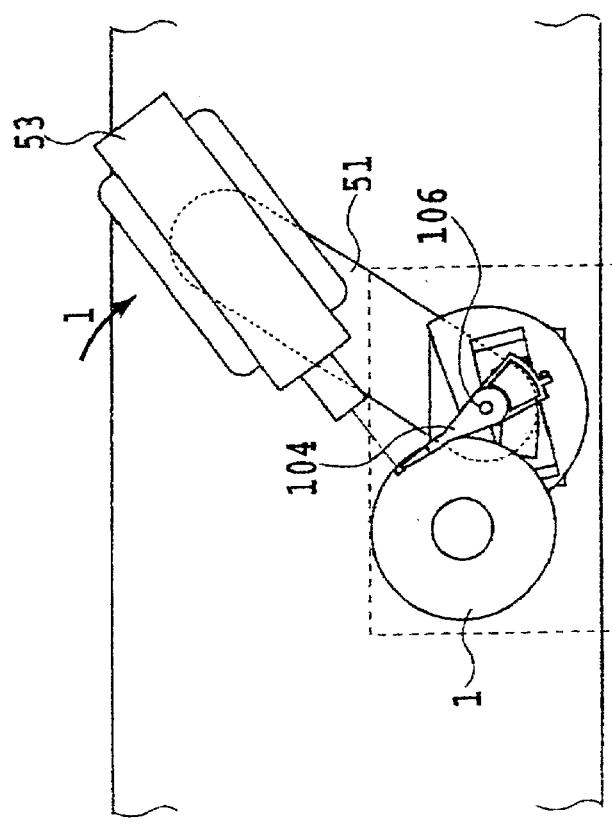
FIG. 11(B) is a top view showing an outer radius portion of a magnetic disk measured according to an embodiment of the present invention.
Figure 11A:
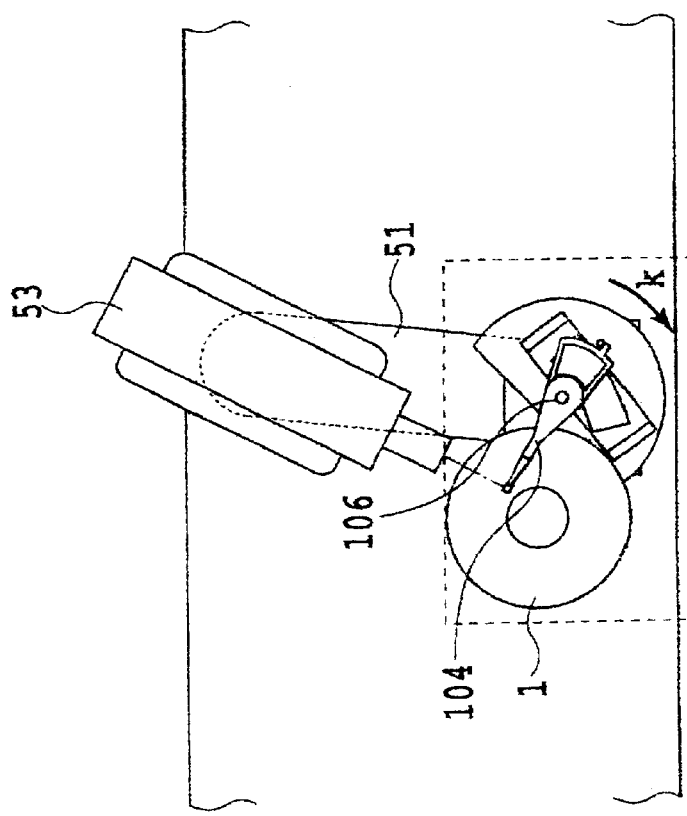
FIG. 11(A) is a top view showing an inner radius portion of a magnetic disk measured according to an embodiment of the present invention.

Referring now to FIGS. 11(A) and 11(B), it is to be understood, that if magnetic disk 1 is evaluated from its inner radius to its outer radius, the focusing operation is required for each evaluation, and this is disadvantageous in terms of working efficiency.

During operation, rotary positioner 104 is initially positioned at an inner radius of magnetic disk 1 (FIG. 11(A)), and positioner rotating stage 100 is then rotated in the direction of an arrow 'k' around rotating shaft 106 to move rotary positioner 104 to an outer radius portion (FIG. 11(B)).

At this time, the moving angle of positioner rotating stage 100 is stored in the memory (not shown) so that measuring rotating arm 51 is rotated through the same moving angle in the same direction as positioner rotating stage 100, i.e. the direction of an arrow 'l' in FIG. 11(B). This rotation correspondingly moves measurement means 53 (laser Doppler vibrometer ). Accordingly, if measuring adjustment is executed once in the initial state in FIG. 11(A), the measuring position is automatically adjusted in FIG. 11(B), thereby relieving the operator from the burden of readjustment and speeding operation and lowering costs.

In the servo state, however, positioner rotating stage 100 actually rotates around rotating shaft 106 in order to free up rotary positioner 104, as described above.

Figure 12:
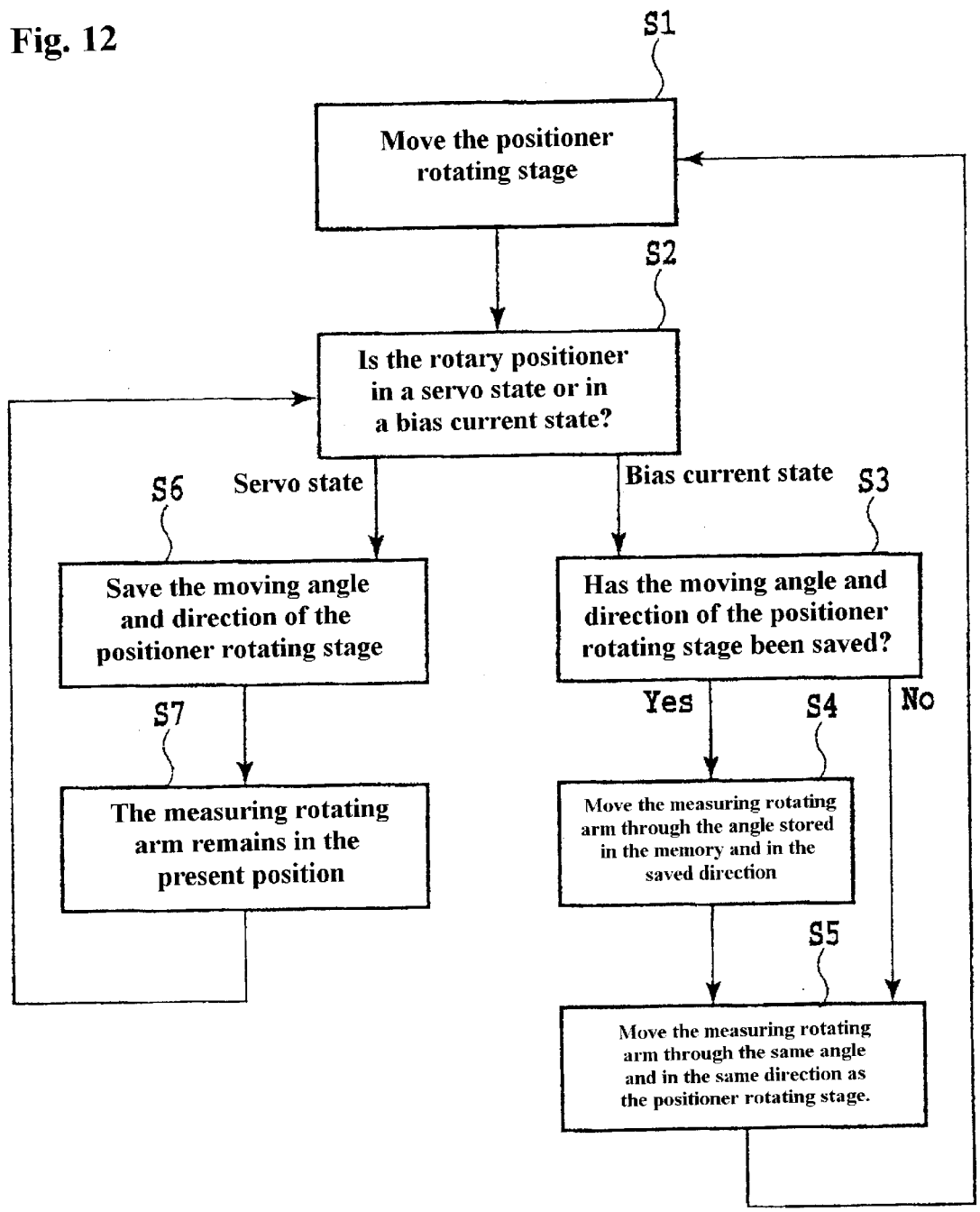
FIG. 12 is a flow chart showing the process of evaluating the performance of temporary servo signals according to one embodiment of the present invention.

Referring additionally now to FIG. 12, during the above operation from initial state to servo state, the following sequence is executed:

First, while current is flowing through voice coil 105 in one direction to rotate rotary positioner 104, measuring rotating arm 51 is moved through the same angle in the same direction as positioner rotating stage 100 (steps S1–S2–S3–S5–S1).

Second, if rotary positioner 104 is in the servo state, to move positioner rotating stage 100, in order to free rotary positioner 104, then the moving direction and angle of positioner rotating stage 100 are stored in the memory (not shown) (steps S1–S2–S6–S7–S2), so that when current flows through voice coil 105 in one direction again, measuring rotating arm 51 is moved using the moving direction and angle stored in the memory (steps S3–S4–S5).

Subsequently, once the evaluation is finished, current starts to flow through voice coil 105 in one direction to rotate rotary positioner 104 in one direction, while rotating positioner rotating stage 100 with lock pin 101 installed thereon to carry rotary positioner 104 to its unload position.

Similarly, evaluating magnetic head 102 is unloaded by executing the above described measuring method in the reverse order. Then, spindle motor 2 stops its rotation, and stage 16 moves to its evaluation end position, thereby completing the series of servo tests.

Figure 13:
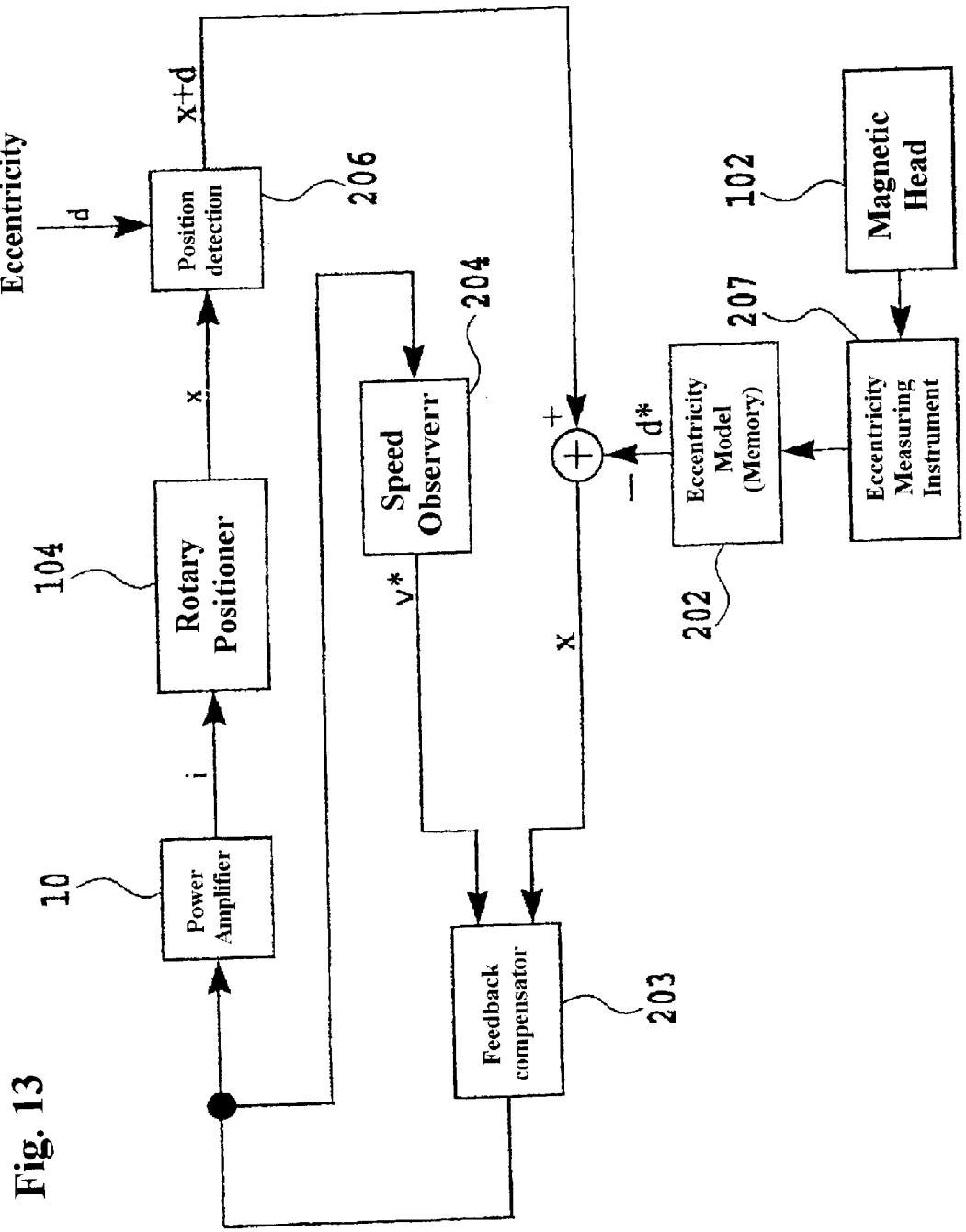
FIG. 13 is a block diagram showing a configuration of a servo system according to an embodiment of the present invention.

Additionally referring now to FIG. 13, describing one configuration of a servo system according to one embodiment of the present invention. In this embodiment, magnetic disk 1 has temporary servo signals previously written thereto, as described above. During operation, after magnetic disk 1 has been rotated and rotary positioner 104 has been loaded, magnetic head 102 is held at an arbitrary position on magnetic disk 1 using lock pin 101. In this state, the temporary servo signals are read by means of magnetic head 102. In addition, the eccentricity caused by the chucking of magnetic disk 1 is measured by means of an eccentricity measuring instrument 207, and the measured eccentricity is recorded in a memory 202.

The eccentricity can be determined from track information and a Position Error Signal (PES) obtained by the servo demodulating circuit on the basis of detection signals for the above-described temporary servo signals. The PES indicates how far magnetic head 102 is separated from the center of a track. Subsequently, since the eccentricity is now calculated, rotary positioner 104 is free to enter the servo state.

A position detecting section 206 detects the position of rotary positioner 104 (and the position of magnetic head 102) on the basis of a signal from magnetic head 102. This detection signal contains the eccentricity of magnetic disk 1.

An eccentricity d* in the initial state, obtained from memory 202, is feed-forward-compensated to cancel the eccentricity d of magnetic disk 1, contained in a position-detecting signal x+d from position detecting section 206, so that the signal for a difference between the resulting head position signal and eccentricity is fed back to rotary positioner 104 via a feedback compensator 203 and power amplifier 10 for positioning control.

Feedback compensator 203 determines a drive signal to rotary positioner 104 from an estimated speed value v* obtained by a speed observer 204 and the above difference signal. Speed observer 204 can be easily composed of a gain compensator (gain K)(not shown in FIG. 13) and an integrator (integral value 1/s)(not shown in FIG. 13), and a gain i from power amplifier 10, as follows:

$$v^* = K \times 1/s \times i \tag{I}$$

where, $$K = K_{AMP} \times Kt \times Rh/J \tag{II},$$

and ($K_{AMP}$=power amplifier gain, Kt=a torque/current constant, Rh=positioner arm length, and J=a positioner inertia moment)

It is to be understood, that for simplification, speed observer 204 may be alternatively omitted to limit feed back to the difference signal.

Figure 14:
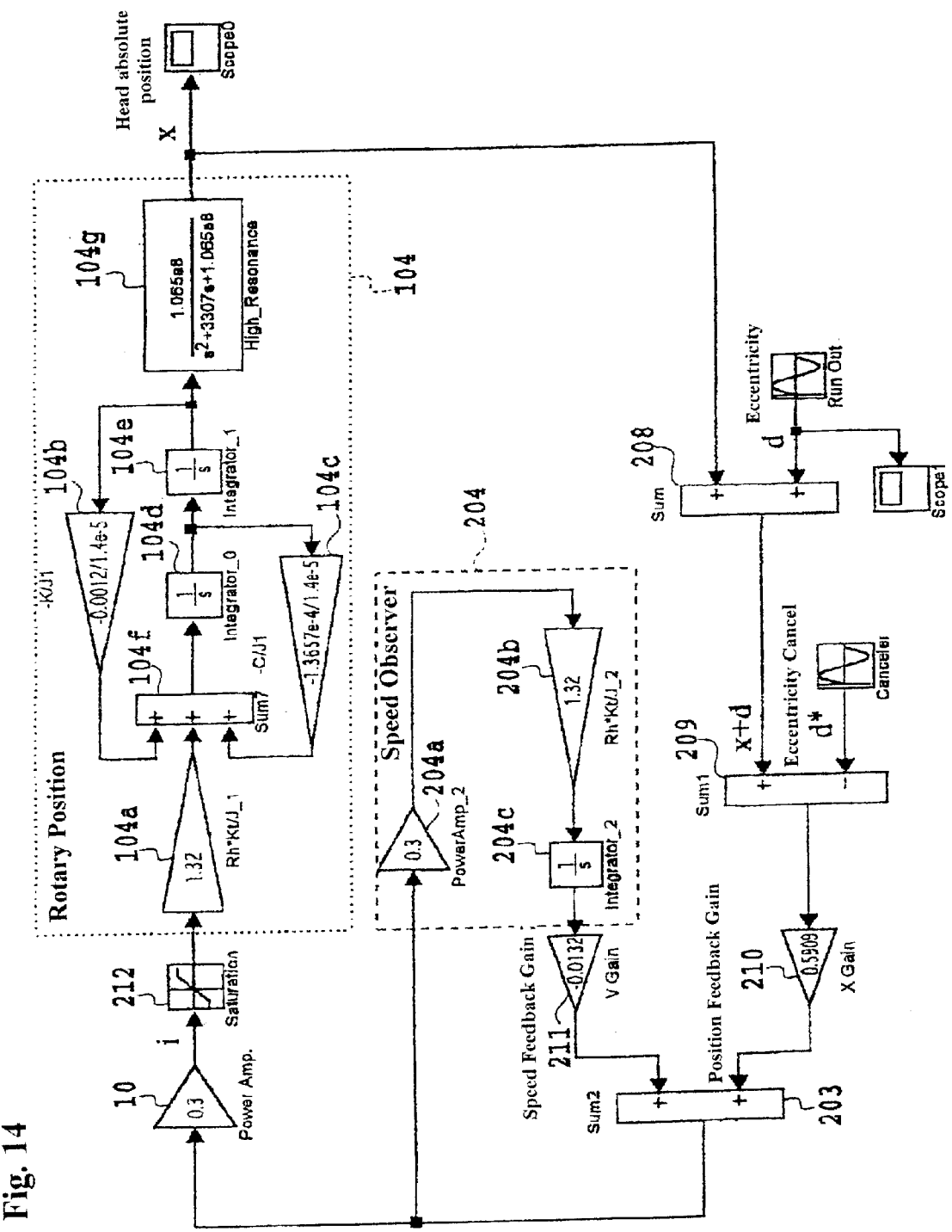
FIG. 14 is a diagram representative of a servo simulation model according to an embodiment of the present invention.

Additionally referring now to FIG. 14, rotary positioner 104 and speed observer 204 are represented as functional blocks. Speed observer 204 is composed of an arithmetic device 204b, as the gain compensator (gain K), an integrator 204c, having an integral value 1/s, and an amplifier 204a having the same gain as power amplifier 10, which are connected in a series to implement the above-described first equation (I).

Rotary positioner 104 consists of a well-known secondary delay system and an high-order resonance model. Rotary positioner is composed of three arithmetic devices 104a, 104b, and 104c, which each perform a corresponding one of the illustrated operations, two integrators 104d and 104e, an adder 104f, and a high-order resonance model 104g to output a signal x indicative of the absolute position of magnetic head 102.

An adder 208 adds the signal x to a value d corresponding to the eccentricity of magnetic disk 102. That is, the eccentricity signal d is added to the signal x indicative of the absolute position of the positioner, to simulate a position signal obtained from the temporary servo signal. An adder 209 adds the value x+d to a value −d* for canceling the eccentricity, to cancel the eccentricity of magnetic disk 102.

Feedback compensator 203 is an adder which adds the output x+(d−d*) from adder 209 and the output v* from speed observer 204 together through a pair of feedback gain amplifiers 210 and 211, to determine a positioner driving input.

This positioner driving input is supplied to rotary positioner 104 for positioning magnetic head 102, through power amplifier 10, for converting the driving input into a current command, and through a limiter 212, for limiting the current command obtained by the conversion, to a definite value.

For example, during operation, the input eccentricity d* has a phase delayed by 30° relative to the eccentricity d. The feedback gains, (position and speed feedback gains) of feedback gain amplifiers 210 and 211, are determined using the pole placement method.

Additionally referring now to FIG. 15(A), representing the above eccentricity signal d, and FIG. 15(B) showing the signal x representative of the absolute position of a positioner as the output from rotary positioner 104. It is to be understood, that a servo signal, containing an eccentricity of ±100 μm of the value in FIG. 15(B), can be used to determine if magnetic head 102 is held on a concentric circle (to an accuracy: 0.1 μm or less).

It is to be understood, that the present invention allows determination as to whether the temporary servo signals are acceptable based on an outside standard.

It is to be understood, that determining whether the temporary servo signals are acceptable can be accomplished without writing the actual servo signals to magnetic disk 1 thus saving time and additional effort.

It is to be understood, that the magnetic head of the present invention is a type capable of recording electronic signals on or reproducing electronic signals from a magnetic disk to enable an effective evaluation of the magnetic disk.

It is to be understood, that determining whether the temporary servo signals are acceptable can be easily accomplished even if magnetic head 102 is moved to alternative or various positions.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the scope of this invention as defined in the following claims. In the claims, means-plus-function clauses are intended to cover the structures described or suggested herein as performing the recited function and not only structural equivalents but also equivalent structures. Thus, for example, although a nail and screw may not be structural equivalents in that a nail relies entirely on friction between a wooden part and a cylindrical surface whereas a screw's helical surface positively engages the wooden part, in the environment of fastening wooden parts, a nail and a screw may be equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetic-disk evaluation apparatus, for evaluating a magnetic disk having a plurality of temporary servo signals, comprising:

a spindle motor;

said spindle motor operating said magnetic disk at a rotation speed effective to enable an evaluation of said magnetic disk;

a rotary positioner supporting a magnetic head about a rotation shaft;

said magnetic head operable relative to said spindle motor and said magnetic disk;

control means for controlling said rotary positioner and said magnetic head on a basis of said plurality of temporary servo signals and positioning said magnetic head relative to a concentric circle centered on said spindle motor prior to said evaluation of said plurality of temporary servo signals;

measurement means for accurately measuring a head displacement of said magnetic head in a seek direction relative said magnetic disk;

detection means for detecting a tip displacement of a tip of said magnetic head on a basis of said head displacement in said seek direction; and determination means for determining whether said temporary servo signals are acceptable, on a basis of said tip displacement, effective to allow said magnetic-disk evaluation apparatus to effective and rapidly evaluate said magnetic disk.

2. A magnetic-disk evaluation apparatus, according to claim 1, further comprising:

fixation means for temporary fixing said rotary positioner effective to locate said magnetic head at an arbitrary position on said magnetic disk;

a positioner rotating stage for supporting said fixation means and said rotary positioner and moving said rotary positioner, fixed by said fixation means, to an arbitrary position on said magnetic disk;

said positioner rotating stage rotating around a rotating center;

a measuring rotating arm rotating around the same said rotating center as said positioner rotating stage based on a movement angle of said positioner rotating stage; and said measurement means on said measuring rotating arm, whereby said measurement means is positioned to effectively measure said displacement of said magnetic head in said seek direction.

3. A magnetic-disk evaluation apparatus according to claim 2, wherein said control means further comprises:

storage means for storing an eccentricity of said magnetic disc measured on a basis of a first signal from said magnetic head reading said temporary servo signals while said rotary positioner is fixed by said fixation means;

cancel means for canceling said eccentricity of said magnetic disk in said first signal from said magnetic head by receiving a feed forward input of said eccentricity stored in said storage means and by generating a second signal; and feedback compensating means for generating, from at least said second signal sent from said cancel means, a third signal for feedback-controlling of said rotary positioner, enabling effective cancellation of eccentricity in a speedy manner.

4. A magnetic-disk evaluation apparatus according to claim 3, wherein:

said measurement means is a laser Doppler vibrometer effective to measure said displacement of said magnetic head in said seek direction by irradiating a side of said magnetic head with a plurality of laser beams and receiving a reflection therefrom.

5. A magnetic-disk evaluation apparatus, for evaluating a magnetic disk having a plurality of temporary servo signals, comprising:

a spindle motor;

said spindle motor operating said magnetic disk at a rotation speed effective to enabling an evaluation of said magnetic disk;

a rotary positioner supporting a magnetic head about a rotation shaft;

said magnetic head operable relative to said spindle motor and said magnetic disk;

control means for controlling said rotary positioner and said magnetic head on a basis of said plurality of temporary servo signals and positioning said magnetic head relative to a concentric circle centered on a center of said spindle motor prior to said evaluation of said plurality of temporary servo signals;

measurement means for accurately measuring a head displacement of said magnetic head in a seek direction;

detection means for detecting a tip displacement of a tip of said magnetic head on a basis of said head displacement in said seek direction;

determination means for determining whether said temporary servo signals are acceptable, on a basis of said tip displacement, effective to allow said magnetic-disk evaluation apparatus to effective and rapidly evaluate said magnetic disk;

fixation means for temporary fixing said rotary positioner effective to locate said magnetic head at an arbitrary position on said magnetic disk;

a positioner rotating stage for supporting said fixation means and said rotary positioner and moving said rotary positioner, fixed by said fixation means, to an arbitrary position on said magnetic disk;

said positioner rotating stage rotating around a rotating center;

a measuring rotating arm rotating around the same said rotating center as said positioner rotating stage based on a movement angle of said positioner rotating stage; and said measurement means on said measuring rotating arm, whereby said measurement means is positioned to effectively measure said displacement of said magnetic head in said seek direction.

6. A magnetic-disk evaluation apparatus, comprising:

a magnetic disk including a plurality of temporary servo signals;

a spindle motor on said magnetic-disk evaluation apparatus;

said spindle motor effective to enable an evaluation of said magnetic disk;

a magnetic head operable relative to said spindle motor and said magnetic disk;

a rotary positioner supporting said magnetic head about a rotation shaft;

said rotation shaft supporting at least said magnetic head and said rotary positioner;

voice coil means at a first end of said rotary positioner opposite said magnetic head effective to drive said rotary positioner on a basis of a command;

control means for issuing said command and controlling said rotary positioner on a basis of said plurality of temporary servo signals and positioning said magnetic head relative to a concentric circle centered on a center of said spindle motor prior to said evaluation of said plurality of temporary servo signals;

measurement means for accurately measuring a first displacement of said magnetic head in a seek direction;

detection means for detecting a second displacement of a tip of said magnetic head on a basis of said first displacement in said seek direction; and determination means for determining whether said temporary servo signals are acceptable, on a basis of said second displacement, effective to allow said magnetic-disk evaluation apparatus to effective and rapidly evaluate said magnetic disk.

7. A magnetic-disk evaluation apparatus for evaluating a magnetic disk, comprising:

a base effective to support said magnetic-disk evaluation apparatus;

a spindle motor on said base;

said spindle motor rotatable at an arbitrary rotation speed effective to enable said evaluation of said magnetic disk;

a magnetic head operable relative to said spindle motor;

said magnetic head effective for recording signals on and for reproducing signals from said magnetic disk to enable said evaluation;

a suspension supporting said magnetic head;

a rotary positioner supporting said suspension about a rotation shaft;

a voice coil at a first end of said rotary positioner opposite said magnetic head;

said rotation shaft cantilevered from said base and supporting said magnetic head, said suspension, and said rotary positioner;

a first and a second magnet opposite a respective first and second side of said voice coil;

said magnetic disk including a plurality of temporary servo signals;

control means for control driving of said rotary positioner on a basis of said plurality of temporary servo signals and being effective to position said magnetic head on a circle concentric to a center of said spindle motor, prior to an initial evaluation of said plurality of temporary servo signals;

measurement means for measuring a head displacement of said magnetic head in a seek direction;

detection means for detecting a tip displacement of a tip of said magnetic head on a basis of said head displacement in said seek direction; and determination means for determining whether said temporary servo signals are acceptable, on a basis of said tip displacement, whereby said magnetic-disk evaluation apparatus can rapidly and effectively evaluate said magnetic disk.

8. A magnetic-disk evaluation apparatus according to claim 7, further comprising:

fixation means for temporarily fixing said rotary positioner effective to locate said magnetic head at an arbitrary position on said magnetic disk;

a positioner rotating stage for supporting said fixation means and said rotary positioner and moving said rotary positioner, fixed by said fixation means, to an arbitrary position on said magnetic disk;

said positioner rotating stage rotating around a rotating center; and a measuring rotating arm rotating around the same said rotating center as said positioner rotating stage based on a movement angle of said positioner rotating stage; and said measurement means on said measuring rotating arm, whereby said measurement means is positioned to effectively measure said displacement of said magnetic head in said seek direction.

9. A magnetic-disk evaluation apparatus, according to claim 8, wherein:

said measurement means is a laser Doppler vibrometer effective to measure said displacement of said magnetic head in said seek direction by irradiating a side of said magnetic head with a plurality of laser beams to receive a reflection therefrom.

10. A magnetic-disk evaluation apparatus according to claim 8, wherein said control means further comprises:

storage means for storing an eccentricity of said magnetic disc measured on a basis of a first signal from said magnetic head reading said temporary servo signals while said rotary positioner is fixed by said fixation means;

cancel means for canceling said eccentricity of said magnetic disk in said first signal from said magnetic head by receiving a feed forward input of said eccentricity stored in said storage means and by generating a second signal; and feedback compensating means for generating a third signal for feedback-controlling of said rotary positioner, from said second signal sent from said cancel means whereby said eccentricity is effectively canceled in a speedy manner.

11. A magnetic-disk evaluation apparatus, according to claim 7, wherein:

said measurement means is a laser Doppler vibrometer effective to measure said displacement of said magnetic head in said seek direction by irradiating a side of said magnetic head with a plurality of laser beams to receive a reflection therefrom.

12. A magnetic-disk evaluation method for evaluating a magnetic disk, employing a magnetic-disk evaluation apparatus having a base as a support for said apparatus, a spindle motor on said base for rotating said magnetic disk at an arbitrary rotation speed, a magnetic head for recording and reproducing signals on and from said magnetic disk effective to evaluate said magnetic disk, a suspension supporting said magnetic head, a rotary positioner supporting said suspension, a voice coil at first end of said rotary positioner opposite to said magnetic head, a rotating shaft cantilevered from said base, a first and a second magnet opposite a respective first and a second side of said voice coil, said magnetic disk including a plurality of temporary servo signals, said rotating shaft supporting said magnetic head, said suspension, and said rotary positioner, comprising:

a control step of operative control driving of said rotary positioner on a basis of a plurality of temporary servo signals and position said magnetic head on a concentric circle in a center of said spindle motor, before evaluating performance of said temporary servo signals previously written to said magnetic disk, a measurement step of measuring a displacement of said magnetic head in a seek direction;

a detection step of detecting displacement of a tip of said magnetic head on a basis of said displacement in said seek direction measured by a measurement means for measuring said displacement; and a determination step of determining whether said temporary servo signals are acceptable, on the basis of said displacement detected by said detection means, whereby a disk evaluation is made speedier and more effective.

13. A magnetic-disk evaluation method according to claim 12, wherein said measurement step further includes a step of detecting said displacement of said magnetic head by irradiating a side of said magnetic head with a plurality of laser beams to receive reflected light therefrom, whereby accuracy of said measurement step is increased.

14. A magnetic-disk evaluation method according to claim 13, wherein said control step further comprises:

a storage step of storing said eccentricity of said magnetic disc measured on said basis of said signal from said magnetic head reading said temporary servo signals while said rotary positioner is fixed;

a cancel step of canceling said eccentricity of said magnetic disk in said signal from said magnetic head by receiving a feed forward input of said eccentricity stored in said storage means; and a feedback compensating step of generating a signal for feedback-controlling of said rotary positioner, from said signal having said eccentricity canceled at said cancel step.

* * * * *